United States Patent
Yasuda et al.

(10) Patent No.: US 12,483,847 B2
(45) Date of Patent: Nov. 25, 2025

(54) DIRECTING A DRIVERS GAZE BASED ON DIRECTIONAL AUDIO

(71) Applicant: TOYOTA RESEARCH INSTITUTE, INC., Los Altos, CA (US)

(72) Inventors: Hiroshi Yasuda, San Carlos, CA (US); Jean Marcel Dos Reis Costa, San Jose, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 348 days.

(21) Appl. No.: 18/359,824

(22) Filed: Jul. 26, 2023

(65) Prior Publication Data

US 2025/0039625 A1    Jan. 30, 2025

(51) Int. Cl.
  *H04S 7/00* (2006.01)
  *G06F 3/01* (2006.01)

(52) U.S. Cl.
  CPC ............ *H04S 7/30* (2013.01); *G06F 3/012* (2013.01); *G06F 3/013* (2013.01)

(58) Field of Classification Search
  CPC ............ H04S 7/30; G06F 3/012; G06F 3/013
  See application file for complete search history.

(56) References Cited

U.S. PATENT DOCUMENTS

| | | | |
|---|---|---|---|
| 7,415,123 B2 | 8/2008 | Ballas | |
| 9,037,468 B2 | 5/2015 | Osman | |
| 9,271,103 B2 | 2/2016 | Wells | |
| 10,448,189 B2 | 10/2019 | Link | |
| 11,089,427 B1 | 8/2021 | Canberk et al. | |
| 11,584,378 B2 | 2/2023 | Croxford | |
| 2009/0167516 A1 | 7/2009 | Kogawara et al. | |
| 2020/0264006 A1 | 8/2020 | Sommer et al. | |
| 2021/0248775 A1* | 8/2021 | Yasuda | G06V 20/597 |
| 2023/0066670 A1* | 3/2023 | Yasuda | B60W 40/08 |
| 2023/0315369 A1* | 10/2023 | Yasuda | G06V 20/58 701/23 |
| 2025/0037603 A1* | 1/2025 | Yasuda | G06F 3/012 |

* cited by examiner

*Primary Examiner* — David L Ton
(74) *Attorney, Agent, or Firm* — Seyfarth Shaw LLP

(57) ABSTRACT

A method for adjusting a direction of focus for a driver includes identifying a first direction of focus, of the driver of a vehicle, at a first time period in accordance with monitoring one or both of a gaze direction of the driver or a head pose of the driver. The method further includes generating audio from one or more speakers of a set of speakers located within a cabin of the vehicle based on identifying the first direction of focus, a spatial location of the audio corresponding to an expected direction of focus. The method also includes terminating the audio signal in accordance with a second direction of focus, at a second time period, being within a range of the expected direction of focus, the second direction of focus being determined based on the monitoring of one or both of the gaze direction or the head pose.

20 Claims, 8 Drawing Sheets

DIRECTING A DRIVERS GAZE BASED ON DIRECTIONAL AUDIO

BACKGROUND

Field

Certain aspects of the present disclosure generally relate to driver training, and more specifically to directing a driver's gaze based on directional audio.

Background

Driver training is a process of teaching individuals skills and knowledge that may be necessary to operate a motor vehicle safely and effectively. The goal of driving training is to develop the necessary skills and abilities to navigate different road conditions and traffic situations confidently, thereby reducing the risk of accidents and injuries.

Conventional driver training programs involve a combination of theoretical and practical lessons, covering topics such as traffic laws, road signs, vehicle control, maneuvering, and defensive driving techniques. Depending on the type of driving training, the focus may vary. For example, driver education programs aim to provide basic driving knowledge to new drivers, while advanced driving courses may focus on developing specialized driving skills, such as race track driving or off-road driving.

In some cases, certified instructors may conduct training sessions either in a classroom setting or on the road. For example, some conventional driver training programs may involve a human instructor providing verbal instructions to a driver while riding in a passenger seat. Additionally, or alternatively, a leading vehicle may demonstrate the appropriate line along a road or track, providing guidance on control actions and where to look to associate actions with the location. Training aids, such as simulators or virtual reality systems, may also be used to supplement traditional training methods in some cases. These approaches have limitations, including potential issues with visibility or distractions, and may benefit from improvements to provide more effective and accessible training methods.

SUMMARY

In one aspect of the present disclosure, a method for adjusting a direction of focus for a driver includes identifying a first direction of focus, of the driver of a vehicle, at a first time period in accordance with monitoring one or both of a gaze direction of the driver or a head pose of the driver. The method further includes generating audio from one or more speakers of a set of speakers located within a cabin of the vehicle based on identifying the first direction of focus, a spatial location of the audio corresponding to an expected direction of focus. The method also includes terminating the audio signal in accordance with a second direction of focus, at a second time period, being within a range of the expected direction of focus, the second direction of focus being determined based on the monitoring of one or both of the gaze direction or the head pose.

Another aspect of the present disclosure is directed to an apparatus including means for identifying a first direction of focus, of the driver of a vehicle, at a first time period in accordance with monitoring one or both of a gaze direction of the driver or a head pose of the driver. The apparatus further includes means for generating audio from one or more speakers of a set of speakers located within a cabin of the vehicle based on identifying the first direction of focus, a spatial location of the audio corresponding to an expected direction of focus. The apparatus further includes means for terminating the audio signal in accordance with a second direction of focus, at a second time period, being within a range of the expected direction of focus, the second direction of focus being determined based on the monitoring of one or both of the gaze direction or the head pose.

In another aspect of the present disclosure, a non-transitory computer-readable medium with non-transitory program code recorded thereon is disclosed. The program code is executed by a processor and includes program code to identify a first direction of focus, of the driver of a vehicle, at a first time period in accordance with monitoring one or both of a gaze direction of the driver or a head pose of the driver. The program code further includes program code to generate audio from one or more speakers of a set of speakers located within a cabin of the vehicle based on identifying the first direction of focus, a spatial location of the audio corresponding to an expected direction of focus. The program code also includes program code to terminate the audio signal in accordance with a second direction of focus, at a second time period, being within a range of the expected direction of focus, the second direction of focus being determined based on the monitoring of one or both of the gaze direction or the head pose.

Another aspect of the present disclosure is directed to an apparatus having a processor, and a memory coupled with the processor and storing instructions operable, when executed by the processor, to cause the apparatus to identify a first direction of focus, of the driver of a vehicle, at a first time period in accordance with monitoring one or both of a gaze direction of the driver or a head pose of the driver. Execution of the instructions also cause the apparatus to generate audio from one or more speakers of a set of speakers located within a cabin of the vehicle based on identifying the first direction of focus, a spatial location of the audio corresponding to an expected direction of focus. Execution of the instructions also cause the apparatus to terminate the audio signal in accordance with a second direction of focus, at a second time period, being within a range of the expected direction of focus, the second direction of focus being determined based on the monitoring of one or both of the gaze direction or the head pose.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
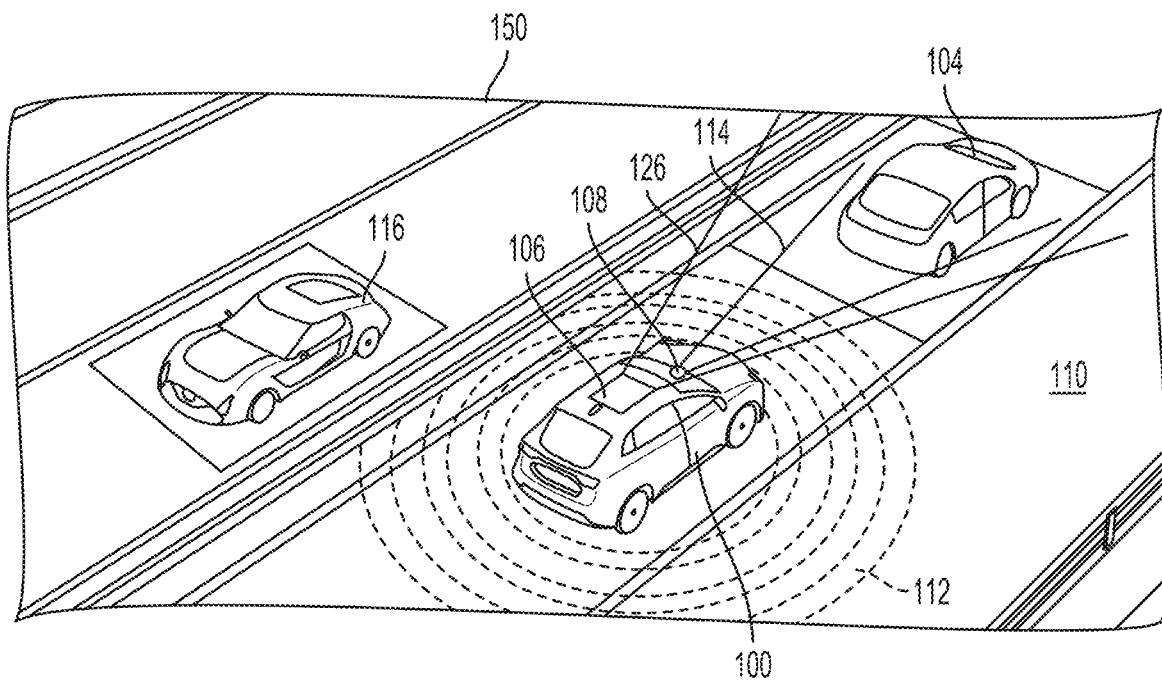
FIG. 1A is a diagram illustrating an example of a vehicle in an environment, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

In some cases, certified instructors may conduct training sessions either in a classroom setting or on the road. For example, some conventional driver training programs may involve a human instructor providing verbal instructions to a driver while riding in a passenger seat. Additionally, or alternatively, a leading vehicle may demonstrate the appropriate line along a road or track, providing guidance on control actions and where to look to associate actions with the location. Training aids, such as simulators or virtual reality systems, may also be used to supplement traditional training methods in some cases. These approaches have limitations, including potential issues with visibility or distractions, and may benefit from improvements to provide more effective and accessible training methods.

Various aspects of the present disclosure are directed to providing a training aid that utilizes directional audio to facilitate driver training. In some examples, the directional audio may be provided (e.g., output) via a helmet worn by the driver. In such examples, a set of speakers may be integrated with the help, such that one or more speakers of the set may provide directional audio cues for the driver's gaze direction and/or head pose direction. The gaze direction refers to the orientation or position of the driver's gaze (e.g., field of view) relation to a reference point or coordinate system. The head pose direction refers to the orientation or position of the driver's head in relation to a reference point or coordinate system. Specifically, the head pose direction is associated with the angle or tilt of the driver's head in various directions, such as up and down, left and right, or tilt sideways.

In some examples, when the driver is navigating through an environment, such as a race track, one or more speakers may be used to output sounds that correspond to a direction that the driver should be focused on. In the present application, sounds may also be referred to as tones or audio (hereinafter used interchangeably). In some examples, a driver training system associated with the system may monitor the driver's head pose and/or gaze direction using a driver monitoring system. In some such examples, the one or more cameras integrated with a vehicle may track the driver's face and/or eyes, which may align with a direction of the helmet. A spatial direction of the audio may be adjusted in accordance with a current helmet direction and/or eye gaze estimated based on tracking the driver's face and/or eyes. In such examples, the driver training systems exploit a human's ability to identify a direction of a sound source in order for the driver to maintain an appropriate gaze direction and/or head pose direction.

In some examples, the driver training system may be used to train a driver on a race track, wherein the driver may be tasked with learning an appropriate path and speed along the race track. However, aspects of the present disclosure are not limited to race track training, as other types of driver training, such as highway training or city driver training, are contemplated. In some examples, the directional audio may provide real-time feedback and guidance to the driver, thereby improving the effectiveness of the driver training process. Furthermore, the directional audio may be more accurate than a human instructor, further improving the effectiveness of the driver training process. Additionally, or alternatively, the use of directional audio may reduce the need for a human instructor, thus, resulting in a more accessible and cost-effective driver training process.

As discussed, various aspects of the present disclosure may be used to train a driver of a vehicle. However, aspects of the present disclosure are not limited to vehicles, such as cars. Aspects of the present disclosure also contemplate other types of vehicles, such as boats or airplanes. In some examples, the vehicle, such as a race car or sports car, may be operated in a manual driving or a shared-control mode. Manual driving refers to a conventional driving mode, in which the driver manually controls the various functions of the vehicle, such as acceleration, braking, and steering. In contrast, in the shared-control mode, the driver and the vehicle's automated systems may share control of the vehicle. In the shared-control mode, one or more systems associated with the vehicle may take over some functions.

For example, the one or more systems may take control over accelerating and braking, while the driver retains control of steering.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view 126.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in the environment 150. The LIDAR sensor 106 may vertically and horizontally scan the environment 150. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. Additionally, or alternatively, information obtained from one or more sensors that monitor objects within the vehicle 100 and/or forces generated by the vehicle 100 may be used to generate notifications when an object may be damaged based on actual, or potential, movement.

Figure 1B:
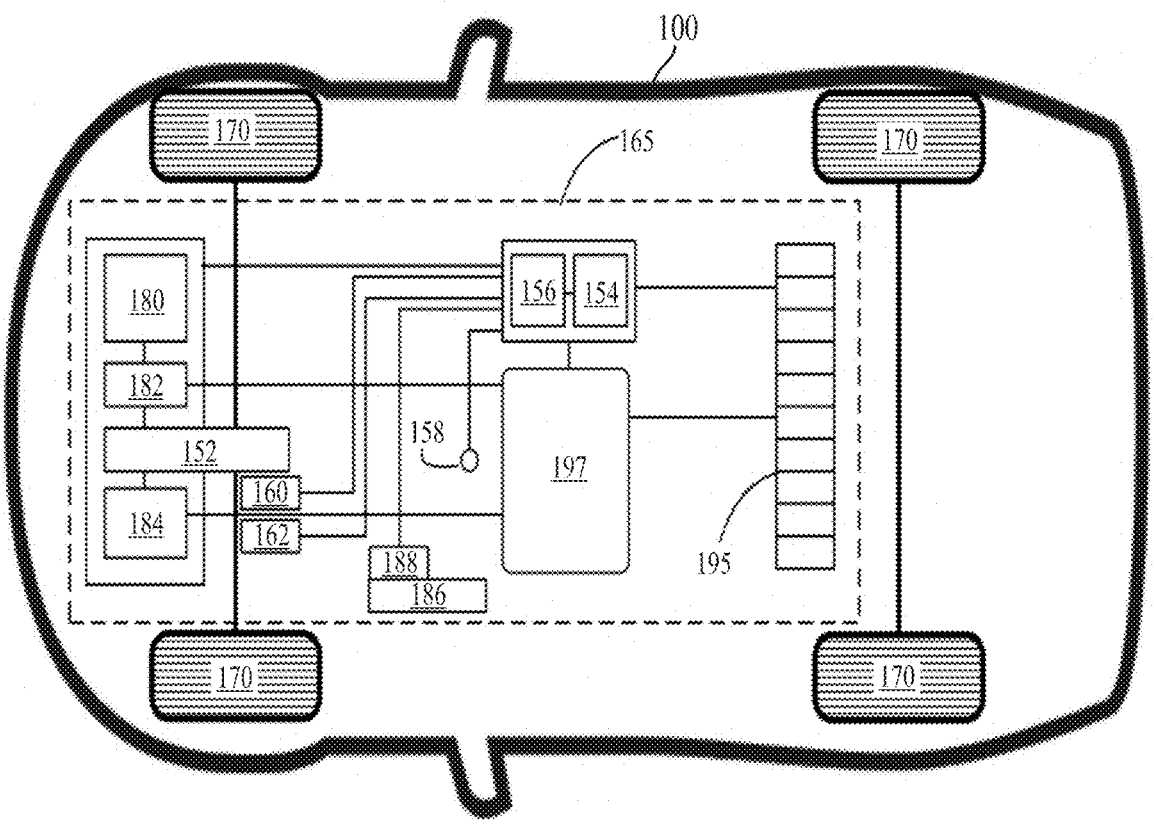
FIG. 1B is a diagram illustrating an example a vehicle, in accordance with various aspects of the present disclosure.

FIG. 1B is a diagram illustrating an example the vehicle 100, in accordance with various aspects of the present disclosure. It should be understood that various aspects of the present disclosure may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184.

In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally), the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
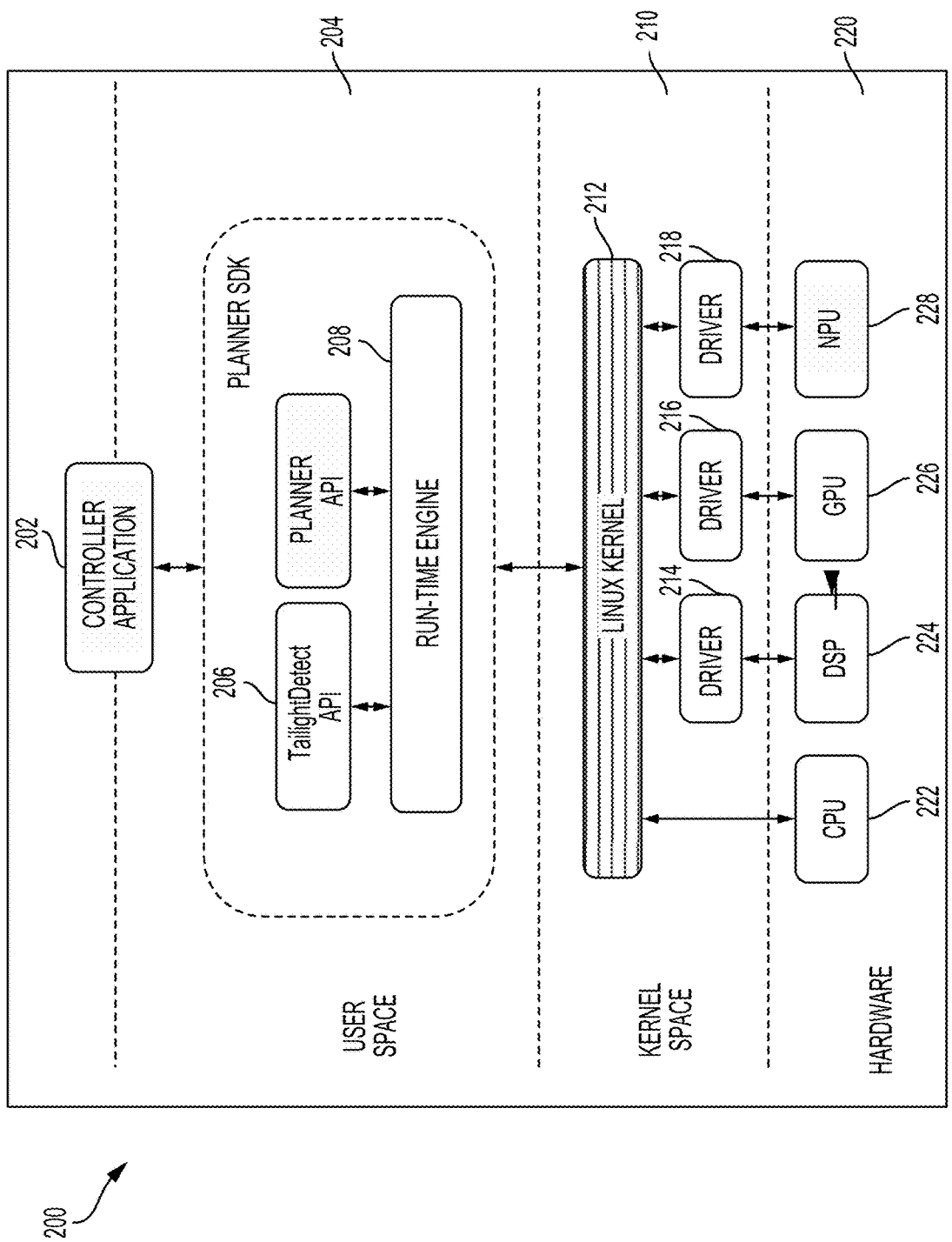
FIG. 2 is a block diagram illustrating a software architecture that may modularize artificial intelligence (AI) functions for planning and control of an autonomous agent, in accordance with various aspects of the present disclosure.

FIG. 2 is a block diagram illustrating a software architecture 200 that may modularize artificial intelligence (AI) functions for planning and/or controlling one or more actions of the vehicle 100, according to aspects of the present disclosure. Using the architecture, a controller application 202 may be designed such that it may cause various processing blocks of a system-on-chip (SOC) 220 (for example a central processing unit (CPU) 222, a digital signal processor (DSP) 224, a graphics processing unit (GPU) 226 and/or an network processing unit (NPU) 228 to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a taillight prediction application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
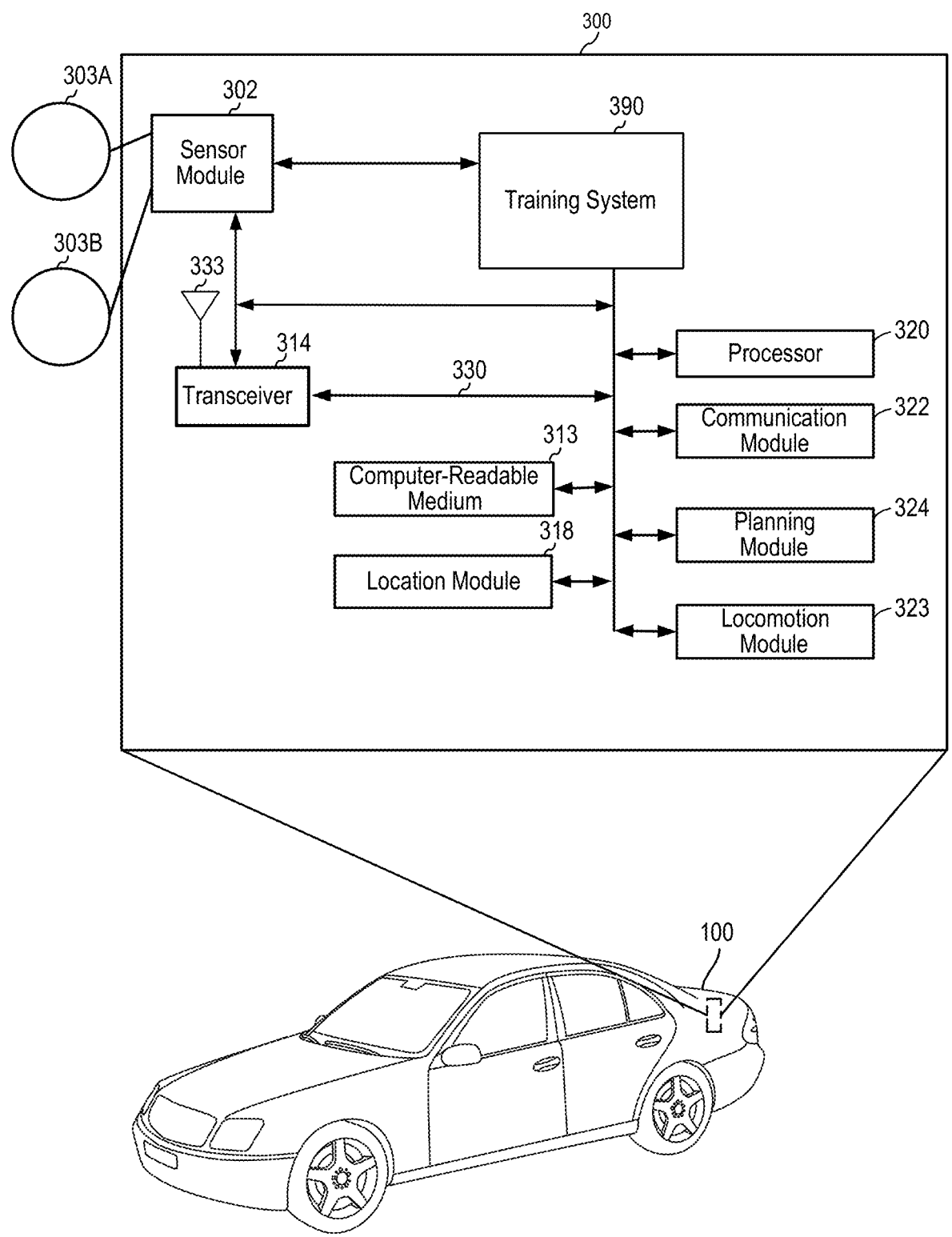
FIG. 3 is a diagram illustrating an example of a hardware implementation for a vehicle control system, in accordance with various aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include a training system 390. In some examples, training system 390 is configured to perform operations, including operations of the process 500 described with reference to FIG. 5.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 314 coupled to the processor 320, the sensor module 302, a comfort module 308, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device. As another example, the transceiver 314 may transmit driving statistics and information from the comfort module 308 to a server (not shown).

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 328, or any of the modules 302, 313, 314, 318, 320, 322, 323, 324, 390. The computer-readable medium 313 may also be used for storing data that is manipulated by the processor 320 when executing the software.

The sensor module 302 may be used to obtain measurements via different sensors, such as a first sensor 303A and a second sensor 303B. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. The measurements of the first sensor 303A and the second sensor 303B may be processed by one or more of the processor 320, the sensor module 302, the comfort module 308, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 328 or may be in communication with the vehicle 328.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 328. For example, the location module 318 may use a global positioning system (GPS) to determine the location of the vehicle 328. The communication module 322 may be used to facilitate communications via the transceiver 314. For example, the communication module 322 may be configured to provide communication capabilities via different wireless protocols, such as Wi-Fi, long term evolution (LTE), 3G, etc. The communication module 322 may also be used to communicate with other components of the vehicle 328 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 323 may be used to facilitate locomotion of the vehicle 328. As an example, the locomotion module 323 may control movement of the wheels. As another example, the locomotion module 323 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 324 for planning a route or controlling the locomotion of the vehicle 328, via the locomotion module 323. A route may be planned to a passenger based on compartment data provided via the comfort module 308. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

The training system 390 may be in communication with the sensor module 302, the transceiver 314, the processor 320, the communication module 322, the location module 318, the locomotion module 323, the planning module 324, and the computer-readable medium 313. In some examples, the training system 390 (e.g., driver training system 390) may be implemented as a machine learning model. Working in conjunction with one or more of the sensors 303A, 303B, the sensor module 302, and/or one or more other modules 313, 314, 318, 320, 322, 323, 324, the training system 390 may perform one or more elements of the process 700 described with reference to FIG. 7.

As discussed, in some conventional driver training programs, a certified instructor may conduct training sessions either in a classroom setting or on the road. For example, some conventional driver training programs may involve a human instructor providing verbal instructions to a driver while riding in a passenger seat. Additionally, or alternatively, a leading vehicle may demonstrate the appropriate line along a road or track, providing guidance on control actions and where to look to associate actions with the location.

In some examples, training aids, such as simulators or virtual reality systems, may also be used to supplement traditional training methods in some cases. Some conventional driver training systems may use a virtual car displayed via a heads-up display (HUD). The HUD may be integrated with the vehicle's windshield, the driver's helmet, and/or a display unit of the vehicle. Such systems are not robust against visibility issues caused by sun glare or bright lights. Furthermore, such systems do not provide a comprehensive field of vision because the HUD may be limited to a certain location of the vehicle, such as directly in front of the driver, and may not display the virtual car via the entire front windshield. Therefore, these conventional solutions have various limitations, including potential issues with visibility or distractions, and may benefit from improvements to provide more effective and accessible training methods.

Various aspects of the present disclosure are directed to providing a training aid that uses directional audio to facilitate driver training. The directional audio may be a training aid that provides cues for a driver to adjust their head pose and/or gaze direction. In some examples, the directional audio may be output via one or more speakers of a set of speakers integrated with a helmet that is worn by the driver. Aspects of the present disclosure are not limited to the set of speakers being integrated with the helmet, the set of speakers, or a subset of the set of speakers, may be integrated with other locations of the vehicle.

In some examples, driver training may be oriented to race track training. In such examples, a driver is tasked with learning an appropriate path and/or speed along the race track. However, aspects of the present disclosure are not limited to race track training, as other types of driver training, such as highway training or city driver training, are contemplated.

Figure 4A:
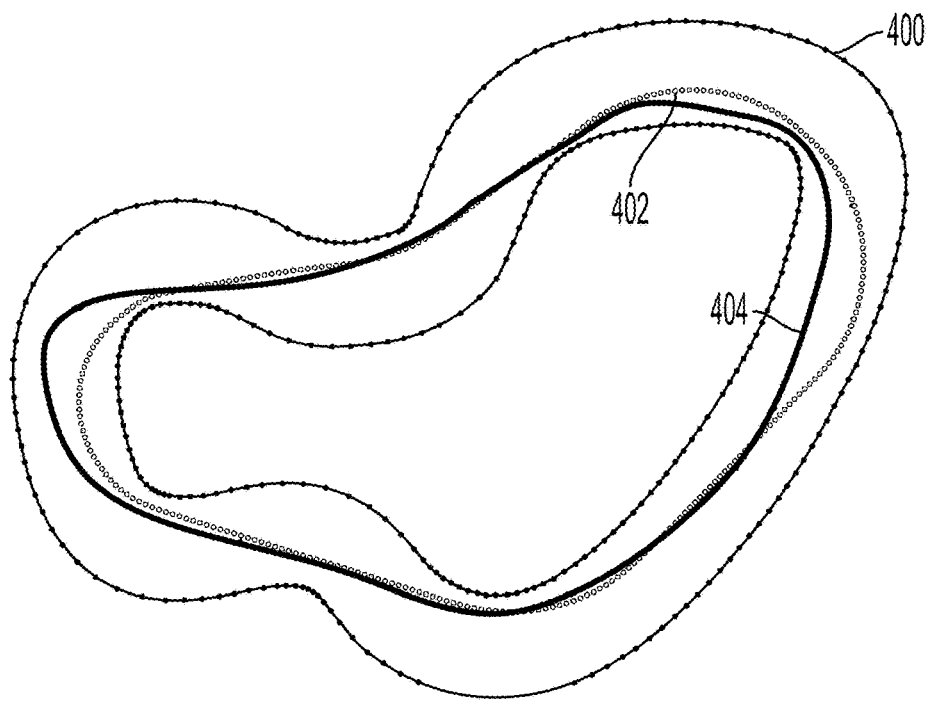
FIG. 4A is a diagram illustrating an example of a track superimposed with an example of a driving line of a vehicle, in accordance with various aspects of the present disclosure.

FIG. 4A is a diagram illustrating an example of a track 400 superimposed with an example of a driving line 404 of a vehicle, in accordance with various aspects of the present disclosure. In the example of FIG. 4A, the vehicle may be an example of the vehicle 100 described with reference to FIGS. 1A, 1B, and 3. In most cases, a driver aims to control the vehicle along the track 400 to achieve a fastest lap time (e.g., time through the track 400). The track 400 may be an example of a circuit, a path, or a race track. The driving line 404 represents an example of a path taken by the vehicle through the track 400. The driving line 404 is merely one example, other driving lines are possible. It may be desirable to train a driver to optimize the driving line 404, such that the vehicle minimizes a lap time. In some examples, a simulated vehicle may be used to train the driver to drive the best line. The best line may also be referred to as an ideal route (hereinafter used interchangeably).

Figure 4B:
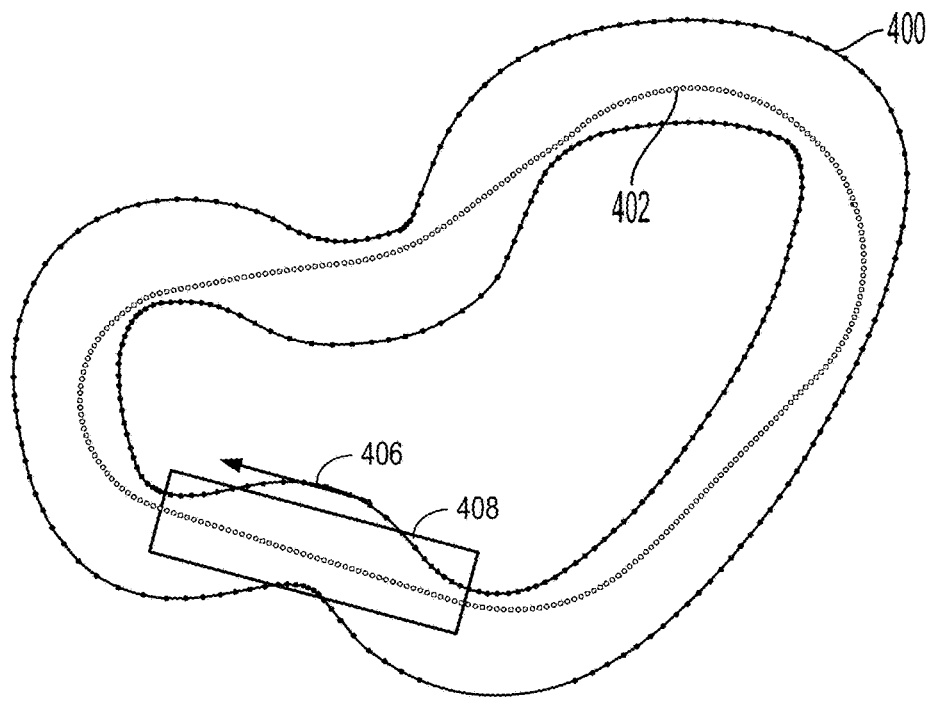
FIG. 4B is a diagram illustrating an example of the track superimposed with an example of a best line, in accordance with various aspects of the present disclosure.

FIG. 4B is a diagram illustrating an example of the track 400 superimposed with an example of a best line 402, in accordance with various aspects of the present disclosure. In most cases, a goal of a race car driver is to use the best line 402 to navigate a vehicle, such as the vehicle 100 described with reference to FIGS. 1A, 1B, and 3, through the race track 402 in accordance with a fastest possible path. The best line 402 may be an example of an ideal racing line that is associated with the fastest possible path through the track 400. The best line may also be referred to as an ideal line or an ideal path. In the example of FIG. 4B, the best line 402 differs from the driving line 404 shown in FIG. 4A. Thus, the driver associated with the driving line 404 may be in need of training to achieve the best line 402 on the track 400. It should be noted that the best line 402 is not a physical line on the track 400, rather, it is a theoretical line that may be used to achieve a fastest lap time.

Various guidelines may be defined for the best line 402. For ease of explanation, the best line 402 may balance the following guidelines while finding the fasted possible path through the race track 400. The guidelines include, but are not limited to, using a full width of the track 400, reducing an amount of braking, accelerating through a curve, and driving in a straight line as much as possible.

Using a full width of the track may allow the vehicle to achieve the widest possible turning radius around a curve. This may achieve the fastest path through the track 400 because the wider the turn, the faster the vehicle can go through it. Reducing the amount of braking may be quantified based on an amount of deceleration and/or an amount of time associated with applying the brakes. It may be desirable to apply the brakes prior to beginning a turn. Additionally, the vehicle may achieve the fastest path through the track 400 by exiting a curve at full throttle. Finally, maximizing an amount of time driving in the straight line may maximize the total amount of time spent at a top speed.

Beyond these guidelines, finding the best line 402 may also depend on various factors, such as load balancing of the vehicle, a nature of the track 400, and the driver's reaction time and state of mind. In some aspects of the present disclosure, one or more best lines 402 may be generated by a human driver and/or a machine learning model. In some examples, one or more drivers may drive the course, and the best line 402 may be a function, such as an average, of the drivers' fastest time. Additionally, or alternatively, the machine learning model may learn the best line 402 associated with a fastest time through the track 400 based on the one or more guidelines as well as other factors, such as load balancing, the nature of the track, human reaction times, vehicle types, and/or other factors. In some examples, a group of best lines may be, where each best line of the group of best lines may be associated with one or more of a respective driving condition, respective driving style, and/or respective vehicle. In such examples, during training, the driver may select a best line from the group of best lines. In some examples, the machine learning model may adapt one or more best lines to a driver's specific abilities. Additionally, or alternatively, the machine learning model may adapt one or more best lines based on a vehicle, driving conditions (e.g., weather), road conditions, and/or other factors.

Additionally, or alternatively, in some examples, the best line 402 may be determined by recording of the driver's previous laps. This data may provide insights into a driver's consistent route, potentially pointing to the driver's optimal line based on their unique driving style, their choice of vehicle, and their reaction to specific track conditions. Additionally, or alternatively, in some examples, the best line 402 may be determined by recording one or more professional drivers. In such examples, the seasoned expertise and experience of the one or more professional drivers may guide the driver training system to select the quickest path around a track. That is, the best line 402 may be based on one or more routes used by the one or more professional drivers.

Additionally, or alternatively, in some examples, the best line 402 may be determined based on one or more computer simulations. By incorporating factors such as the vehicle's physics, the layout and condition of the track, and prevailing environmental conditions, the computer simulations may calculate and suggest the ideal route (e.g., best line 402).

The computer simulation, driver's previous laps, and/or professional driver laps may be integrated with the machine learning model to adapt the best line 402 to a range of factors, including the driver's specific abilities, the vehicle, the driving conditions like weather, road conditions, and more. This multifaceted strategy can aid in improving driver performance and refining vehicular navigation on the course, thereby fostering quicker lap times and more efficient driving habits.

In some examples, the machine learning model may associate a respective gaze direction and/or respective head position with different sections of the best line 402. For example, at a portion 408 of the best line 402, the gaze direction and/or head position should be in a direction corresponding to a directional arrow 406. The gaze direction and/or head position may be determined based on training, observing previous routes of the driver, observing previous routes of one or more professional drivers, and/or a computer simulation. The training may include observing gaze directions and/or head positions of human drivers, such as the current driver and/or professional drivers, along the current track and/or different tracks. Based on the observations, gaze directions and/or head positions may be associated with features of a best line 402 and/or track 400. Additionally, or alternatively, the training may include inferring a gaze direction and/or head position based on a direction of travel along the best line 402. For example, a gaze direction and/or head position should be straight ahead along a straight portion of the best line 402. As another example, a gaze direction and/or head position may be toward an inside of a turn during a turning portion of the best line 402.

In some examples, the driver training system orients a driver's gaze and/or head pose to landmarks, rather than arbitrary points. These landmarks may be within the track or in the surrounding landscape. For example, an the driver training system cause the driver to focus on a specific observation tower at the edge of the track, or on a certain mountain in the distance. These landmarks can serve as reference points to help drivers maintain the correct orientation and trajectory, particularly on complex or unfamiliar tracks. Similarly, apex points—the innermost points of a turn on the track—are another typical gaze target. By focusing on the apex point, drivers can better judge when to turn and how sharply, helping them navigate the turn more smoothly and efficiently.

The professional knowledge of focal points on a track or a road may be incorporated into the driver training system. The system is programmed with the locations of these landmarks and uses them to determine the intended head pose for the driver. For example, if the driver should be looking at the observation tower but is instead looking straight ahead, the driver training system may adjust the driver's gaze towards the tower. By incorporating these professional techniques and strategies into the system, the driver training system not only helps drivers achieve the correct head pose but also guides them towards more effective and safer driving habits. This makes the system an invaluable tool for both novice drivers and experienced drivers looking to refine their skills.

Aspects of the present disclosure are not limited to finding the best line 402 for the track 400 illustrated in FIG. 4B. The track 400 is used as an example, one or more best lines may be determined for one or more other tracks used to train a driver. Each of the one or more best lines may be stored in computer-readable medium (e.g., memory) associated with the vehicle, such as the computer-readable medium 313 described with reference to FIG. 3. Additionally, or alternatively, each of the one or more best lines may be stored in the respective computer-readable medium of one or more remote devices associated with a driver training system. In some such examples, the one or more best lines may be wirelessly transmitted to the vehicle prior to training a driver on a track. In some examples, the vehicle may autonomously transmit its positioning information to the driver training system, such that the driver training system automatically transmits the one or more best lines associated with a track corresponding to the vehicle's current location in response to receiving the positioning information from the vehicle.

In some examples, a driver or a trainer loads a desired best line associated with the track where the driver will be trained prior to initiating a driving training program. The best line may be selected from one or more best lines stored in the vehicle or received from remote devices via a wireless connection. In such examples, one or more best lines may be stored for one or more different tracks. Additionally, or alternatively, pre-defined map information, such as map information for a city, may be used to determine one or more best lines for the pre-defined map information. In such examples, the driver may be trained to efficiently navigate through city streets. Once the driver selects the desired best line, the directional audio system may be used to guide the driver's gaze and/or head position while the driver navigates the track 400.

According to various aspects of the present disclosure, directional audio may provide real-time feedback and guidance to the driver. The feedback and guidance may serve as a training aide to teach the driver where to look while navigating along a track or a route. As discussed, the directional audio system is not limited to training driver's on a track and may be used to train drivers in other driving situations. For example, the directional audio system may provide audio feedback that directs a driver to look in their blind spot when changing lanes.

Figure 5:
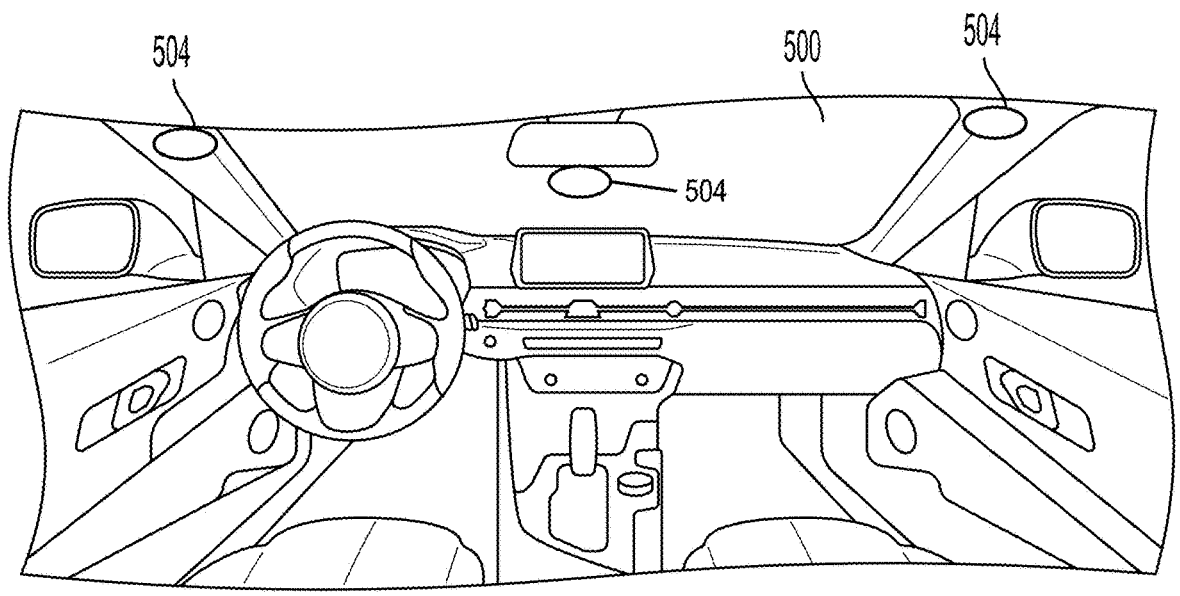
FIG. 5 is a diagram illustrating an example of an interior of a vehicle that includes a driver monitoring system, in accordance with various aspects of the present disclosure.

In some examples, one or more internal sensors, such as internal cameras, associated with a driver monitoring system may be used to determine a direction of a driver's gaze and/or head direction. FIG. 5 is a diagram illustrating an example of an interior 500 of a vehicle that includes a driver monitoring system, in accordance with various aspects of the present disclosure. The vehicle may be an example of the vehicle 100 described with reference to FIGS. 1A, 1B, and 3. The interior 500 may also be referred to as a cabin. In the example of FIG. 5, the interior 500 includes a set of sensors 504, associated with the driver monitoring system, that may capture images of a driver to determine the direction of the driver's gaze and/or head direction. Additionally, or alternatively, one or more sensors integrated with the helmet may be associated with the driver monitoring system to determine the direction of the driver's gaze and/or head direction. For example, one or more cameras integrated with the helmet may capture the driver's gaze. Additionally, or alternatively, one or more sensors, such as a gyroscope, integrated with the helmet may determine the driver's head position.

As discussed, various aspects of the present disclosure use a driver monitoring system, which may include one or more sensors, such as one or more cameras, to track the driver's head pose and/or eye gaze direction. The one or more sensors may be focused on the driver's face and/or eyes, allowing the system to monitor the respective movement and/or orientation of the face and/or eyes. The direction of the driver's head pose may correspond to the pose of the helmet. The driver's head pose refers to the position and orientation of their head in relation to a reference point or coordinates system, such as a three-dimensional (3D) coordinate system. The head pose may describe the tilt, rotation, and position of the driver's head in the 3D coordinate system.

The driver training system adjusts directional audio cues based on the driver's head pose and/or eye gaze direction detected by the driver monitoring system. As an example, when the driver turns their head, causing a change in the orientation of their face and helmet, the system identifies this change. If the driver's head or gaze is not in an appropriate direction, the driver training system activates one or more speakers, from the set of speakers, to produce a sound from the appropriate direction. Thus, the driver receives audio cues associated with a direction where the driver should be focused, thereby improving the driver's spatial awareness and assisting the driver in maintaining appropriate focus during navigation.

Figure 6A:
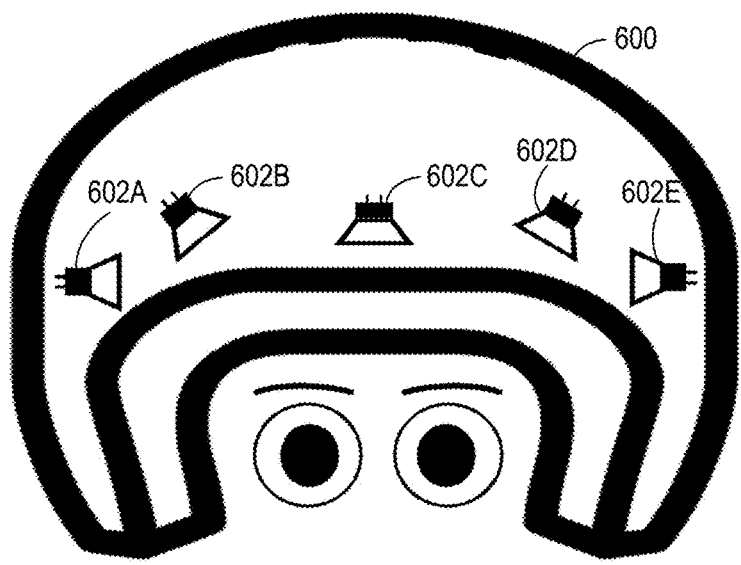
FIG. 6A is a diagram illustrating an example of a helmet associated with a driver training system, in accordance with various aspects of the present disclosure.

FIG. 6A is a diagram illustrating an example of a helmet 600 associated with a driver training system, in accordance with various aspects of the present disclosure. As shown in the example of FIG. 6A, the helmet 600 may include a set of speakers 602A, 602B, 602C, 602D, and 602E. Aspects of the present disclosure are not limited to the set of speakers 602A, 602B, 602C, 602D, and 602E shown in FIG. 6A, additional or fewer speakers may be integrated with the helmet 600. Additionally, or alternatively, a location of the set of speakers 602A, 602B, 602C, 602D, and 602E may differ from the respective locations shown in the example of FIG. 6A. In some examples, one or more of the set of speakers 602A, 602B, 602C. 602D, and 602E may be used to output audio corresponding to a spatial direction, such that a driver may turn focus their attention to the direction of the audio. In some examples, each speaker 602A. 602B, 602C, 602D, and 602E or a subset of the speakers 602A, 602B, 602C, 602D, and 602E may be associated with a respective spatial direction. A sound emitted from the set of speakers 602A, 602B, 602C, 602D, and 602E may direct the driver to an intended direction (e.g., expected direction) within a 3D space around the driver. That is, the spatial direction of the audio may cause the driver to adjust their head pose and/or gaze to any direction within the 3D coordinate system in relation to the driver's current head pose and/or gaze.

Figure 6B:
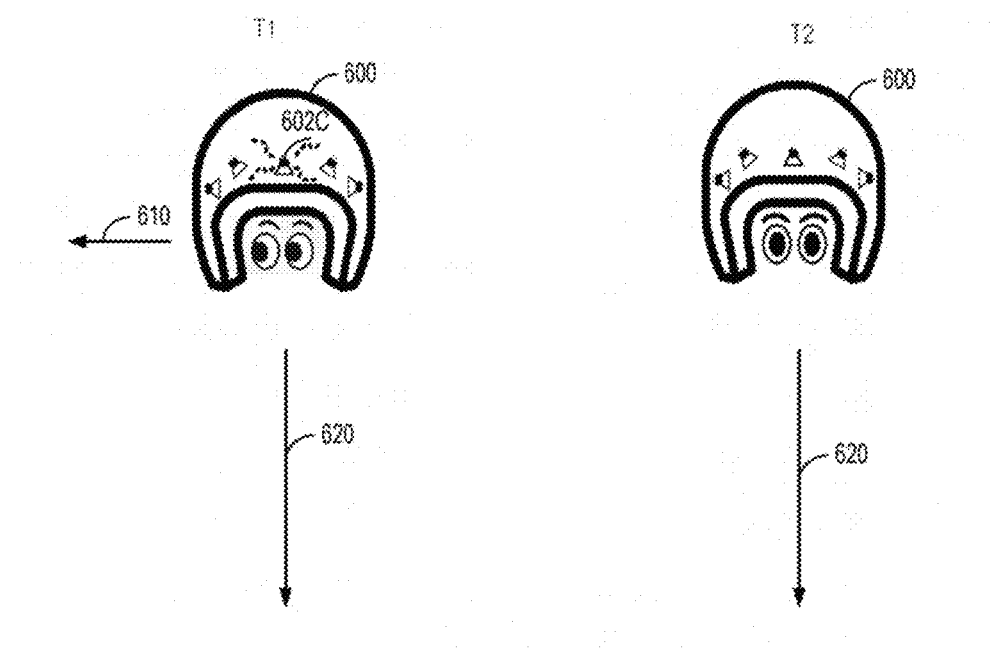
FIG. 6B is a diagram illustrating an example of controlling a driver's eye gaze direction, in accordance with various aspects of the present disclosure.

FIG. 6B is a diagram illustrating an example of controlling a driver's eye gaze direction, in accordance with various aspects of the present disclosure. Eye gaze direction refers to the direction in which a person's eyes are focused or looking. The eye gaze direction may indicate a specific point or area in the person's field of view that their eyes are directed towards. The eye gaze direction may be described in terms of vertical, horizontal, and/or depth dimensions. As shown in the example of FIG. 6B, a driver may be wearing the helmet 600 associated with the driver training system. The helmet 600 may also be referred to as the driver training helmet. The helmet 600 includes the set of speakers 602A, 602B, 602C, 602D, and 602E described with reference to FIG. 6A. For brevity, the individual speakers 602A, 602B, 602C, 602D, and 602E are not labeled in the example of FIG. 6B.

As shown in FIG. 6B, at time t1, the driver monitoring system may detect the driver's gaze is in a first direction 610 (e.g., to the driver's right), while an intended gaze direction is a second direction 620 (e.g., straight ahead). Based on detecting that the driver's gaze is not in the intended direction 620, the driver training system may generate an output from one or more speakers associated with a spatial direction corresponding to the intended direction 620.

In the example of FIG. 6B, a third speaker 602C may be associated with the spatial direction corresponding to the intended direction 620. Therefore, the third speaker 602C may emit audio (shown as the dashed lines in FIG. 6B) to notify the driver that their gaze should be directed to the second direction 620. A magnitude and/or frequency of the emitted sound may be adjusted based on an offset between the driver's current gaze direction 610 and the intended direction 620. Additionally, in some examples, an activated speaker may change based on a change in an orientation of the helmet (e.g., the driver's face).

The driver may identify the direction of the emitted sound from the third speaker 602C. Based on identifying the direction of the emitted sound, at time t2, the driver's gaze may be adjusted to the intended direction 620. In the example of FIG. 6A, the sound emitted from the third speaker 602C is muted in response to the gaze being aligned with the intended direction 620.

In some examples, a first sound emitted for adjusting a gaze may be different from a second sound emitted for adjusting a head pose. Additionally, or alternatively, a third sound may be emitted to adjust both the head pose and a gaze. In some examples, the emitted sound may fade or an intensity may be adjusted as the driver adjusts their head pose and/or gaze toward an intended direction. The intensity may be adjusted by increasing or decreasing a volume of the sound. In such examples, the intensity of the emitted sound may increase as the driver adjusts their head pose and/or gaze away from the intended direction.

Figure 6C:
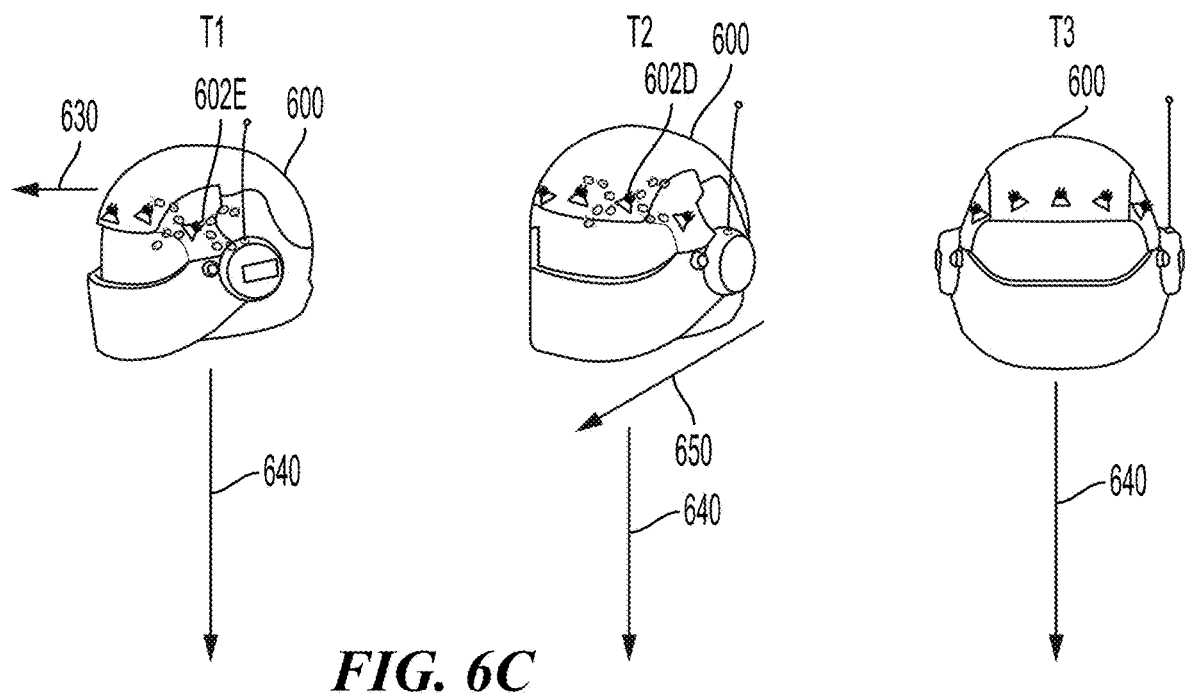
FIG. 6C is a diagram illustrating an example of controlling a driver's head pose direction, in accordance with various aspects of the present disclosure.

FIG. 6C is a diagram illustrating an example of controlling a driver's head pose direction, in accordance with various aspects of the present disclosure. The direction of the driver's head pose may correspond to the direction of the driver's helmet. As shown in the example of FIG. 6C, a driver may be wearing the helmet 600 associated with the driver training system. The helmet 600 includes the set of speakers 602A, 602B, 602C, 602D, and 602E described with reference to FIG. 6A. For brevity, the individual speakers 602A, 602B, 602C, 602D, and 602E are not labeled in the example of FIG. 6C.

As shown in FIG. 6C, at time t1, the driver monitoring system may detect the head pose is in a first direction 630 (e.g., to the driver's right), while an intended gaze direction is a second direction 640 (e.g., straight ahead). Based on detecting that the head pose is not in the intended direction 640, the driver training system may generate an output from one or more speakers associated with a spatial direction corresponding to the intended direction 620.

In the example of FIG. 6C, a fifth speaker 602E may be associated with the spatial direction corresponding to the intended direction 620, in relation to the current head pose at time t1. Therefore, the fifth speaker 602E may emit audio (shown as the dashed lines in FIG. 6C) to notify the driver that their gaze should be directed to the second direction 640. A magnitude and/or frequency of the emitted sound may be adjusted based on an offset between the driver's current gaze direction 630 and the intended direction 640.

The driver may identify the direction of the emitted sound from the fifth speaker 602E. Based on identifying the direction of the emitted sound, at time t2, the driver's head pose may be adjusted toward the intended direction 640. As shown in the example of FIG. 6C, an activated speaker may change based on a change in an orientation of the helmet (e.g., the driver's face). For example, at time t2, the helmet 600 is oriented at a third direction 650, which is approximately 45 degrees between the first direction 630 and the intended direction 640. Given the orientation (e.g., head pose) of the helmet 600 at time t2, the activated speaker may change from the fifth speaker 602E to the fourth speaker 602D to indicate the intended direction 640. Changing the active speaker may prevent a driver from adjusting the head pose and/or eye gaze beyond a desired direction.

In the example of FIG. 6C, at time t3, the head pose may be aligned with the intended direction 630. Therefore, the sound emitted from the fourth speaker 602D is muted in response to the head pose being aligned with the intended direction 640. In some examples, a distinct sound may be emitted from one or more of the speakers 602A, 602B, 602C, 602D, and 602E based on the gaze and/or head pose aligning with an intended direction. Additionally, or alternatively, an intensity of the sound emitted from 602A, 602B, 602C, 602D, and 602E may be adjusted (e.g., increased or decreased) based on the gaze and/or head pose aligning with an intended direction.

As discussed, various aspects of the present disclosure are directed to a driver training system that uses directional audio to train a driver. In some examples, the driver training system may work in conjunction with a driver monitoring system, including one or more sensors, such as cameras, that tracks the head pose and eye gaze direction of the driver. By focusing on the driver's face and eyes, the system can monitor the movement and orientation of these features. The head pose of the driver corresponds to the position and orientation of their head in relation to a reference point or coordinate system. This includes factors like tilt, rotation, and position in a three-dimensional coordinate system.

The driver training system utilizes the data from the driver monitoring system to adjust directional audio cues. For example, when the driver turns their head, causing a change in face and helmet orientation, the system detects this change. If the driver's head or gaze is not in the appropriate direction, the driver training system activates specific speakers to produce sound from the correct direction. This provides the driver with audio cues indicating where they should focus their attention, ultimately improving their spatial awareness and helping them maintain appropriate focus during navigation.

In some examples, a helmet associated with the driver training system may include a set of speakers. Each speaker or a subset of the speakers may output audio corresponding to a specific spatial direction. The emitted sound from these speakers guides the driver's attention to a particular direction within a three-dimensional space surrounding them. That is, the audio's spatial direction prompts the driver to adjust their head pose and gaze in any direction within the three-dimensional coordinate system based on their current head pose and gaze.

In some examples, the driver monitoring system continuously monitors the driver's gaze direction and head pose to ensure they remain focused in the expected direction. The monitoring may be continuous or periodic. If, at a later time period, the driver's focus (e.g., eye gaze and/or head pose direction) shifts to a second direction within a certain range of the expected direction, the driver training system may terminate the audio signal. This second direction of focus may be determined based on the monitoring of the driver's gaze direction and head pose.

The specific range within which the second direction of focus should fall, in order for the audio signal to be terminated, may vary depending on the implementation of the driver training system. The range may be defined to accommodate a reasonable degree of deviation from the expected direction of focus. In some examples, the range is determined based on factors such as a sensitivity of the one or more monitoring sensors, a precision specified for the driver's attention, and/or a specific context of the driving scenario. The range may strike a balance between allowing minor variations in the driver's focus while still ensuring that the attention remains at a particular internal or external location.

By setting the range, the driver training system acknowledges that maintaining a precise and unwavering focus can be challenging, especially in dynamic driving situations. It takes into account the natural movements of the driver's head and eyes and allows for slight adjustments in the focus without immediately terminating the audio cues. Accordingly, the range provides a reasonable tolerance for variations in the driver's focus while still encouraging the driver's focus to stay within the general expected direction.

In some examples, a magnitude, periodicity, and/or frequency of the emitted sound may be adjusted based on the offset between the driver's current gaze direction and the intended direction. This offset represents the disparity between where the driver's eyes and/or head pose direction are currently focused and where they should be focusing according to the training system (e.g., intended direction).

When the driver's gaze and/or head pose direction deviates from the intended direction, the system calculates the offset and may use the offset as a basis for modifying the sound characteristics. The magnitude of the sound can be adjusted to reflect the degree of deviation, with larger deviations resulting in louder or more pronounced audio cues. Similarly, the frequency of the sound can be altered to provide additional feedback, such as increasing the pitch for larger deviations or using different frequencies to differentiate between different levels of deviation.

In some examples, the sound may be continuous. In other examples, the sound may be periodically emitted. In such examples, a periodicity of the sound may be adjusted to reflect the degree of deviation. The periodicity may increase for larger deviations and the periodicity may decrease as the deviation decreases.

By adjusting the magnitude, periodicity, and/or frequency of the emitted sound in relation to the offset between the driver's current gaze and/or head pose direction and the intended direction (e.g., expected direction), the driver training system provides a dynamic and personalized audio feedback mechanism. This helps the driver become more aware of their gaze deviations and encourages them to align their focus with the desired direction, thereby enhancing their spatial awareness and promoting appropriate attention during navigation. The magnitude and/or frequency of the emitted sound may be dynamically adjusted (e.g., increased or decreased) as the offset changes. For example, the magnitude, periodicity, and/or frequency may decrease as the offset decreases. As another example, the magnitude, periodicity, and/or frequency may increase as the offset increases.

According to various aspects of the present disclosure, the intended direction to which the driver should focus can be either internal or external. In some examples, the driver training system may provide audio cues for the driver to focus on objects or areas both inside and outside the vehicle. Inside the vehicle refers to a location within a cabin of the vehicle. By providing internal and external intended directions, the driver training system offers a comprehensive approach to enhancing the driver's spatial awareness and attention.

For internal audio cues, the driver training system may direct the driver's attention to specific instruments or controls within the vehicle. This may include monitoring the driver's gaze and head pose to determine if they are properly attending to the speedometer, fuel gauge, or other relevant displays. If the driver's gaze deviates from these internal points of focus, the system may emit sound cues from the corresponding speakers, guiding the driver's attention back to the intended internal direction.

External cues involve directing the driver's focus towards sections of the road or surrounding environment. For example, the system may analyze the driver's gaze and head pose to ensure they are attentive to the road ahead, traffic signs, pedestrians, or potential hazards. If the driver's gaze drifts away from the intended external direction, the system may adjust the emitted sound to draw their attention back to the appropriate external focus point.

Aspects of the present disclosure may be used by a driver to improve their driving skills and performance on a race track and/or other driving environment. Overall, this approach can benefit both novice and experienced drivers alike, providing a versatile and effective tool for improving their driving abilities.

Figure 7:
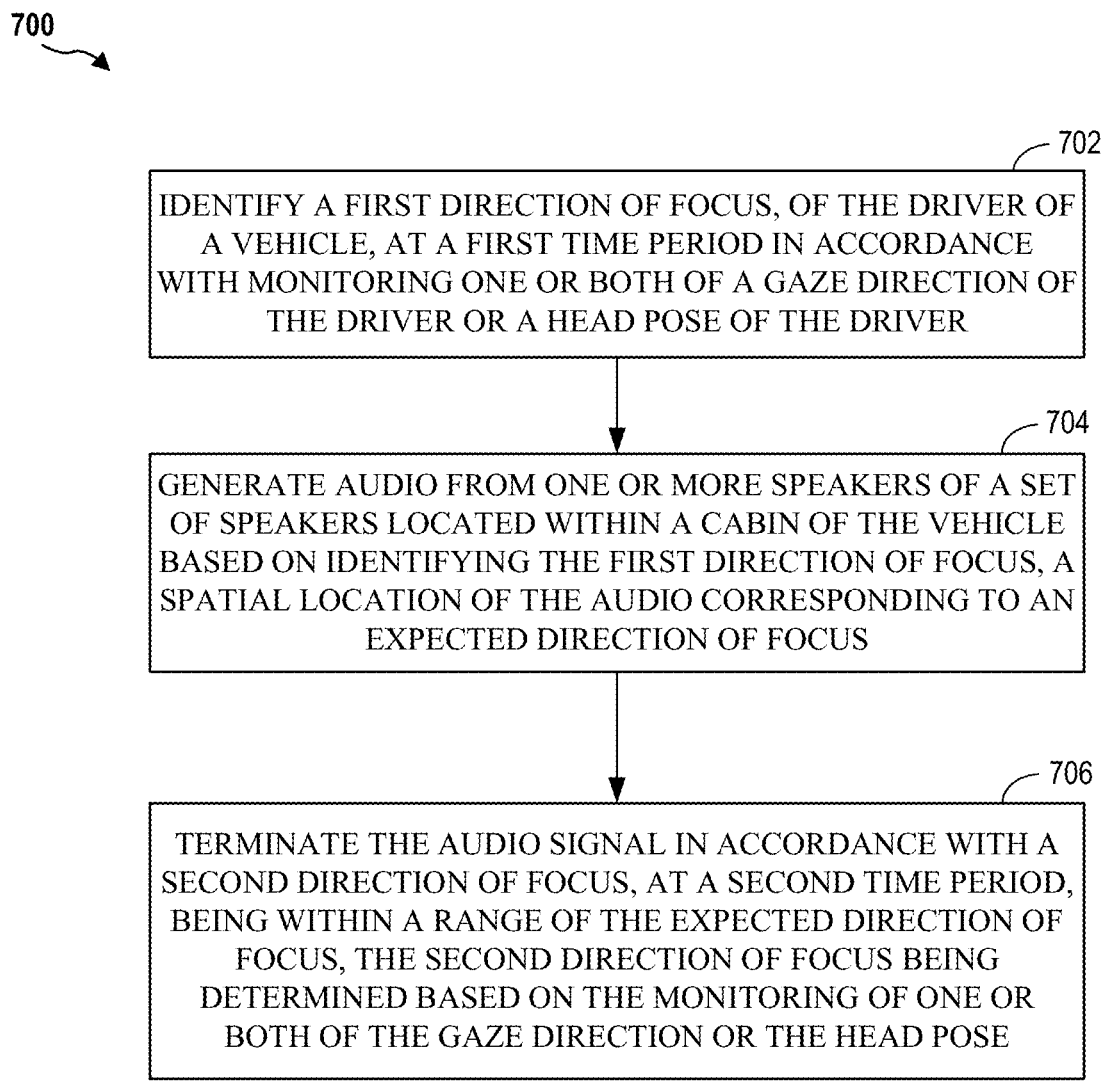
FIG. 7 is a diagram illustrating an example process performed in accordance with various aspects of the present disclosure.

FIG. 7 is a diagram illustrating an example process 700 performed in accordance with various aspects of the present disclosure. The process 700 may be performed by a vehicle, such as a vehicle 100 as described with reference to FIGS. 1A 1B, 3, 5, 6A, 6B, and 6C. The example process 700 is an example of training a driver via directional audio. As shown in the example of FIG. 7, the process 700 begins at block 702 by identifying a first direction of focus, of the driver of a vehicle, at a first time period in accordance with monitoring one or both of a gaze direction of the driver or a head pose of the driver. At block 704, the process 700 generates audio from one or more speakers of a set of speakers located within a cabin of the vehicle based on identifying the first direction of focus, a spatial location of the audio corresponding to an expected direction of focus. At block 706, the process 700 terminates the audio signal in accordance with a second direction of focus, at a second time period, being within a range of the expected direction of focus, the second direction of focus being determined based on the monitoring of one or both of the gaze direction or the head pose.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for adjusting a direction of focus for a driver, comprising:
    identifying a first direction of focus, of the driver of a vehicle, at a first time period in accordance with monitoring one or both of a gaze direction of the driver or a head pose of the driver;
    generating audio from one or more speakers of a set of speakers located within a cabin of the vehicle based on identifying the first direction of focus, a spatial location of the audio corresponding to an expected direction of focus; and
    terminating the audio signal in accordance with a second direction of focus, at a second time period, being within a range of the expected direction of focus, the second direction of focus being determined based on the monitoring of one or both of the gaze direction or the head pose.

2. The method of claim 1, wherein the first direction of focus and the second direction of focus are determined via one or more sensors associated with the vehicle.

3. The method of claim 1, further comprising dynamically adjusting a magnitude, a periodicity, and/or a frequency associated with the audio signal in accordance with a difference between an offset between the first direction of focus and the expected direction of focus.

4. The method of claim 1, further comprising determining the expected direction of focus in accordance with one or more previous observations of the driver, one or more previous observations of one or more other drivers, and/or one or more computer simulations.

5. The method of claim 1, wherein the expected direction of focus is a first location within a cabin of the vehicle or a second location that is external to the vehicle.

6. The method of claim 1, wherein the set of speakers are integrated with a helmet worn by the driver.

7. The method of claim 1, wherein:
    the expected direction of focus is one of a group of expected directions of focus; and
    each one of the group of expected directions of focus is associated with a respective geographic location in an environment.

8. An apparatus for adjusting a direction of focus for a driver, comprising:
    a processor; and
    a memory coupled with the processor and storing instructions operable, when executed by the processor, to cause the apparatus to:
        identify a first direction of focus, of the driver of a vehicle, at a first time period in accordance with monitoring one or both of a gaze direction of the driver or a head pose of the driver;

generate audio from one or more speakers of a set of speakers located within a cabin of the vehicle based on identifying the first direction of focus, a spatial location of the audio corresponding to an expected direction of focus; and terminate the audio signal in accordance with a second direction of focus, at a second time period, being within a range of the expected direction of focus, the second direction of focus being determined based on the monitoring of one or both of the gaze direction or the head pose.

9. The apparatus of claim 8, wherein the first direction of focus and the second direction of focus are determined via one or more sensors associated with the vehicle.

10. The apparatus of claim 8, wherein execution of the instructions further cause the apparatus to dynamically adjust a magnitude, a periodicity, and/or a frequency associated with the audio signal in accordance with a difference between an offset between the first direction of focus and the expected direction of focus.

11. The apparatus of claim 8, wherein execution of the instructions further cause the apparatus to determine the expected direction of focus in accordance with one or more previous observations of the driver, one or more previous observations of one or more other drivers, and/or one or more computer simulations.

12. The apparatus of claim 8, wherein the expected direction of focus is a first location within a cabin of the vehicle or a second location that is external to the vehicle.

13. The apparatus of claim 8, wherein the set of speakers are integrated with a helmet worn by the driver.

14. The apparatus of claim 8, wherein:
the expected direction of focus is one of a group of expected directions of focus; and
each one of the group of expected directions of focus is associated with a respective geographic location in an environment.

15. A non-transitory computer-readable medium having program code recorded thereon for adjusting a direction of focus for a driver, the program code executed by a processor and comprising:

program code to identify a first direction of focus, of the driver of a vehicle, at a first time period in accordance with monitoring one or both of a gaze direction of the driver or a head pose of the driver;

program code to generate audio from one or more speakers of a set of speakers located within a cabin of the vehicle based on identifying the first direction of focus, a spatial location of the audio corresponding to an expected direction of focus; and program code to terminate the audio signal in accordance with a second direction of focus, at a second time period, being within a range of the expected direction of focus, the second direction of focus being determined based on the monitoring of one or both of the gaze direction or the head pose.

16. The non-transitory computer-readable medium of claim 15, wherein the first direction of focus and the second direction of focus are determined via one or more sensors associated with the vehicle.

17. The non-transitory computer-readable medium of claim 15, wherein the program code further comprises program code to dynamically adjust a magnitude, a periodicity, and/or a frequency associated with the audio signal in accordance with a difference between an offset between the first direction of focus and the expected direction of focus.

18. The non-transitory computer-readable medium of claim 15, wherein the program code further comprises program code to determine the expected direction of focus in accordance with one or more previous observations of the driver, one or more previous observations of one or more other drivers, and/or one or more computer simulations.

19. The non-transitory computer-readable medium of claim 15, wherein the expected direction of focus is a first location within a cabin of the vehicle or a second location that is external to the vehicle.

20. The non-transitory computer-readable medium of claim 15, wherein the set of speakers are integrated with a helmet worn by the driver.

\* \* \* \* \*